(12) United States Patent
Lowry et al.

(10) Patent No.: US 9,952,968 B2
(45) Date of Patent: Apr. 24, 2018

(54) METHODS AND SYSTEM FOR MAINTAINING DATA COHERENCY IN DISTRIBUTED DATA CACHE NETWORK

(75) Inventors: Lee Edward Lowry, Orem, UT (US); Brent Thurgood, Spanish Fork, UT (US); Stephen R Carter, Spanish Fork, UT (US)

(73) Assignee: Micro Focus Software, Inc., Provo, UT (US)

( * ) Notice: Subject to any disclaimer, the term of this patent is extended or adjusted under 35 U.S.C. 154(b) by 298 days.

(21) Appl. No.: 12/696,689

(22) Filed: Jan. 29, 2010

(65) Prior Publication Data

US 2011/0191541 A1 Aug. 4, 2011

(51) Int. Cl.
| | | |
|---|---|---|
| *G06F 12/08* | (2016.01) | |
| *G06F 17/30* | (2006.01) | |
| *H04L 29/08* | (2006.01) | |
| *G06F 12/0815* | (2016.01) | |
| *G06F 3/0481* | (2013.01) | |

(52) U.S. Cl.
CPC .......... *G06F 12/08* (2013.01); *G06F 12/0815* (2013.01); *G06F 17/30902* (2013.01); *H04L 67/2852* (2013.01); *G06F 3/0481* (2013.01); *G06F 2212/264* (2013.01); *H04L 29/08729* (2013.01)

(58) Field of Classification Search
CPC .................. G06F 12/08; G06F 12/0815; G06F 17/30902; G06F 2212/264; G06F 3/0481; H04L 67/2852; H04L 29/08729
See application file for complete search history.

(56) References Cited

U.S. PATENT DOCUMENTS

| | | |
|---|---|---|
| 6,836,825 B2 | 12/2004 | Goff |
| 6,973,546 B2 | 12/2005 | Johnson |
| 7,203,754 B2 | 4/2007 | Bai et al. |
| 7,254,617 B2 | 8/2007 | Schuh et al. |
| 7,293,156 B2 | 11/2007 | Zohar et al. |
| 7,318,165 B2 | 1/2008 | Fricanco et al. |
| 7,321,956 B2 | 1/2008 | Gschwind et al. |
| 7,383,329 B2 | 6/2008 | Erickson |
| 7,546,422 B2 | 6/2009 | George et al. |

(Continued)

OTHER PUBLICATIONS

"Cache sychronization", http://www.service-architecture.com/object-relational-mapping/articles/cache_sychronization.html, Downloaded Jan. 26, 2010, Barry & Associates, Inc., (Copyright © 2000-2010).

(Continued)

*Primary Examiner* — Arpan P. Savla
(74) *Attorney, Agent, or Firm* — Schwegman Lundberg & Woessner, P.A.

(57) ABSTRACT

Techniques for distributed cache management are provided. A server having backend resource includes a global cache and a global cache agent. Individual clients each have client cache agents and client caches. When data items associated with the backend resources are added, modified, or deleted in the client caches, the client cache agents report the changes to the global cache agent. The global cache agent records the changes and notifies the other client cache agents to update a status of the changes within their client caches. When the changes are committed to the backend resource each of the statuses in each of the caches are updated accordingly.

16 Claims, 3 Drawing Sheets

(56) References Cited

U.S. PATENT DOCUMENTS

| | | | |
|---|---|---|---|
| 2002/0184444 A1* | 12/2002 | Shandony | 711/118 |
| 2003/0046286 A1* | 3/2003 | Jacobs et al. | 707/8 |
| 2003/0115346 A1* | 6/2003 | McHenry | H04L 67/2847 709/229 |
| 2004/0110497 A1* | 6/2004 | Little | G06F 17/3089 455/418 |
| 2005/0055382 A1* | 3/2005 | Ferrat et al. | 707/201 |
| 2005/0108191 A1* | 5/2005 | Iyengar et al. | 707/1 |
| 2005/0289474 A1* | 12/2005 | Master et al. | 715/765 |
| 2006/0101051 A1* | 5/2006 | Carr et al. | 707/102 |
| 2007/0239797 A1* | 10/2007 | Cattell et al. | 707/201 |
| 2007/0282916 A1* | 12/2007 | Albahari | G06F 17/3056 |
| 2008/0066067 A1* | 3/2008 | Stimpson et al. | 718/100 |
| 2008/0079972 A1* | 4/2008 | Goodwin et al. | 358/1.12 |
| 2009/0106687 A1* | 4/2009 | De Souza Sana et al. | 715/784 |
| 2009/0177658 A1* | 7/2009 | Brantner et al. | 707/8 |
| 2010/0106914 A1* | 4/2010 | Krishnaprasad | G06F 12/0815 711/143 |

OTHER PUBLICATIONS

"Caching and Synchronization in Flex", http://www.slideshare.net/zpinter/caching-and-synchronization-in-flex, Downloaded Jan. 26, 2010, (2009).

"Pagination", https://www.hibernate.org/314.html, Copyright 2009, Red Hat Middleware, LLC. All rights reserved. JBoss and Hibernate are registered trademarks and servicemarks of Red Hat, Inc., (Last rewritten Jul. 2007).

"SCSP (Server Cache Synchronization Protocol)", http://www.linktionary.com/s/scsp.html, Copyright (c) 2001 Tom Sheldon and Big Sur Multimedia, Downloaded Jan. 26, 2010, (2001).

Bitar, P., et al., "Multiprocessor cache synchronization: issues, innovations, evolution", *ACM SIGARCH Computer Architecture News*, 14(2), http://portal.acm.org/citation.cfm?id=17405, (1986), 424-433.

* cited by examiner

METHODS AND SYSTEM FOR MAINTAINING DATA COHERENCY IN DISTRIBUTED DATA CACHE NETWORK

BACKGROUND

With the advent of the World-Wide Web (WWW) and the Internet, client-server architecture has become commonplace. That is, individual client devices connect to backend web sites or portals to acquire and/or update information. This is particularly true in enterprise environments but is also prevalent with consumers that access enterprise resources, where those resources are controlled by back-end systems.

Typically, in a client server environment having back-end database services (one type of backend resource managed via a server), such as Structured Query Language (SQL), SAP, Lightweight Directory Access Protocol (LDAP), etc. users via client devices (clients) access data and perform a variety of operations on the back-end data such as additions, deletions, and/or modifications. For performance reasons, the data that the user views and manipulates are often confined to a local cache of the client. So, volatile operations such as updates (commits) to the back-end systems are often delayed or batched at different times during the day or perhaps less frequently, such as just once a day.

One problem with local client caching in a distributed environment is that users may be viewing and manipulating data that is stale or that has pending changed states from what is actually present in a user's cache; so, different users within the distributed environment are often unaware of the pending changes on the data that are changed in a local cache of another user but that are uncommitted to the backend server. Therefore, data synchronization can become an issue. Techniques to force locking to avoid synchronization issues result in performance bottlenecks if locks and commits are performed more regularly to avoid the inherent synchronization issues.

Additionally, when changes are made, cached results that a user is manipulating can require re-pagination within the cache, such that items that appeared on one page may actually need updated to appear on different pages within the user cache.

Thus, it can be seen that improved techniques for distributed cache management are needed.

SUMMARY

In various embodiments, techniques for distributed cache management are presented. More specifically, and in an embodiment, a method for distributed cache management is provided. Specifically, a global cache on a server is configured to manage state changes for data items that are cached in multiple network clients. A notice is received from a first agent, which processes on a first client, the notice indicating a pending change to a particular data item was made within a first cache of the first client. The pending change is recorded within the global cache when the pending change comports with a policy. Finally, the pending change is pushed to one or more second agents from the global cache or the pending change is pulled from the global cache by the one or more second agents. Each second agent processing on a different second client and each different second client having a second cache where the data items are being independently accessed.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

Various embodiments of this invention can be implemented in existing network architectures. For example, in some embodiments, the techniques presented herein are implemented in whole or in part in the Novell® network and proxy server products, operating system products, directory-based products and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
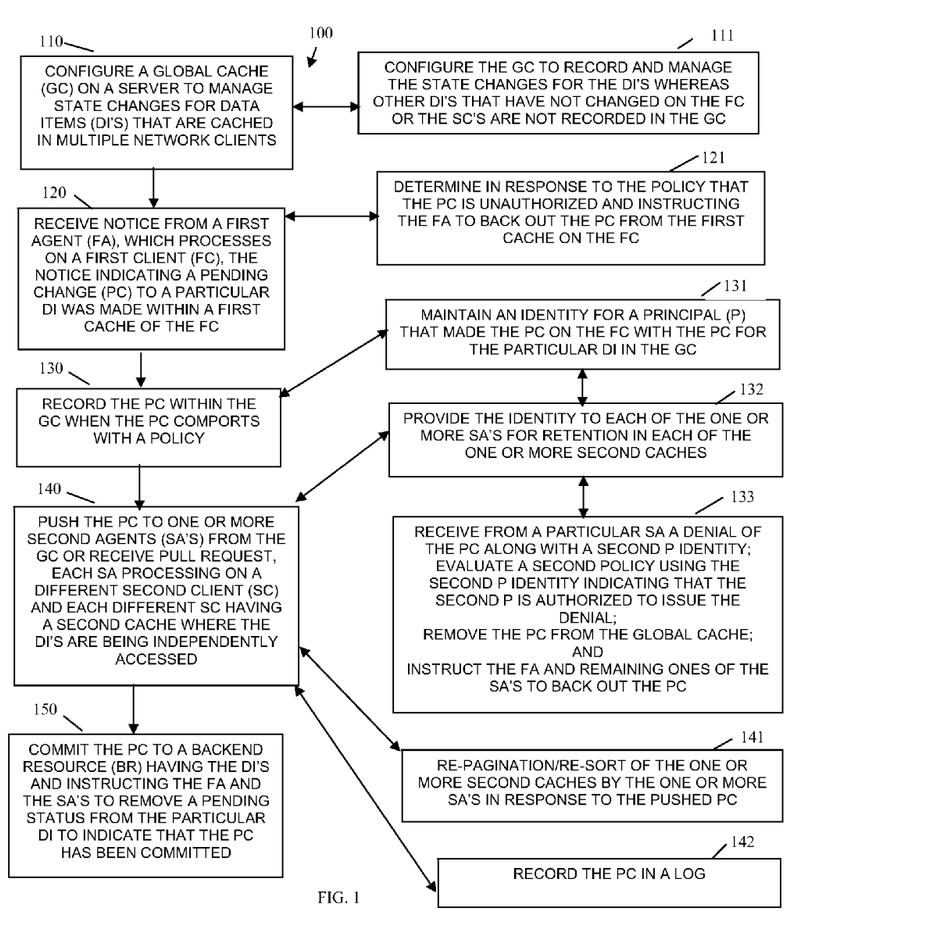
FIG. 1 is a diagram of a method for distributed cache management, according to an example embodiment.
Figure 2:
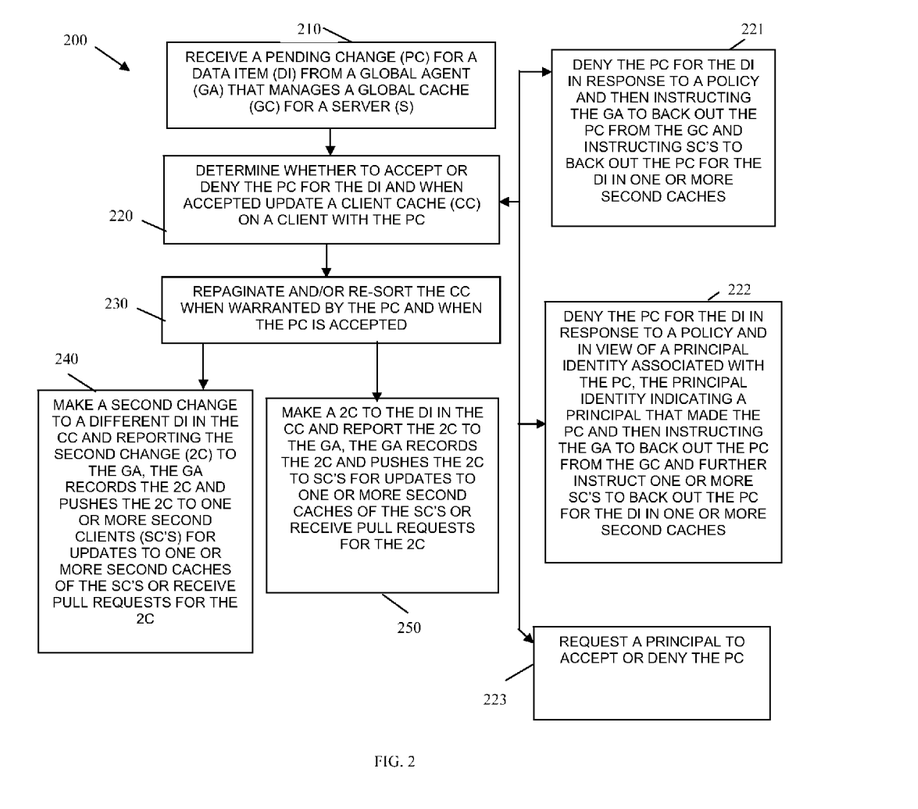
FIG. 2 is a diagram of another method for distributed cache management, according to an example embodiment.
Figure 3:
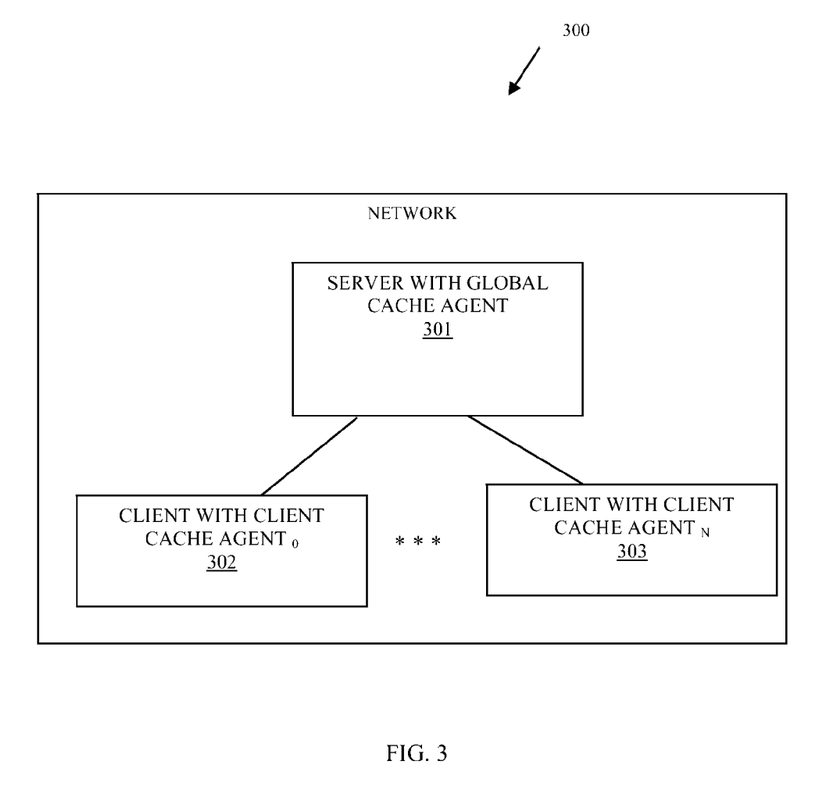
FIG. 3 is a diagram of a distributed cache management system, according to an example embodiment.

It is within this context that embodiments of the invention are now discussed within the context of FIGS. 1-3.

FIG. 1 is a diagram of a method 100 for distributed cache management, according to an example embodiment. The method 100 (hereinafter "global cache service") is implemented in a machine-accessible and computer-readable medium and instructions that execute on one or more processors (machines, computers, processors, etc.), such as a server. The machine is specifically configured to process the global cache service. Furthermore, the global cache service is operational over and processes within a network. The network may be wired, wireless, or a combination of wired and wireless.

In an embodiment, the global cache service acts as a global cache agent for a server providing backend resources to client devices.

At 110, the global cache service configures a global cache on a server to manage state changes for data items that are being actively cached in multiple different network clients over a network connection, such as, but not limited to the Internet. The global cache is a centralized cache in the processing environment of the server or on the server. In some cases, the global cache service may act as a reverse proxy to a backend resource of the server. Some backend resources include, but are not limited to, database, data warehouses, directory services, and the like.

A "data item" is a unit of information that is provided by the backend resource or is being provided to the backend resource. The term "backend" refers to the fact that the resource is controlled or accessed via the server. That is, access to the resource from the perspective of the clients occurs via the server.

According to an embodiment, at 111, the global cache service configures the global cache to record and manage state changes for the data items whereas other data items that have not been actively altered or changed on the first client or other second clients of the network are not recorded or tracked by the global cache service in the global cache. So, the global cache service just has to manage, control, synchronize, and track changes to data items. These changes can include modifications to existing data items, deletions of existing data items and/or newly added data items not previously present in the backend resource.

It is also noted that the global cache service manages changes that have not been fully updated, flushed, or committed to the backend resource. So, once a particular change to a particular data item is flushed from the global cache to update the backend resource, such data item no longer needs tracked unless of course a client subsequently changes that data item. Just the changes need to be monitored and once those changes are fully updated they no longer are monitored by the global cache service via the global cache.

At 120, the global cache service receives notice from a first agent, which processes on a first client of the network. The notice indicates that a pending change to a particular data item was made within a first cache of the first client. The first agent processes on the first client and manages sending the notice to the global cache service when a first principal (user or automated application) makes the pending change to the particular data item, which thereby updates the first cache on the first client.

In an embodiment, at 121, the global cache service determines based on or in response to a policy that the pending change is unauthorized. In such a case, the global cache service instructs the first agent to back out the pending change to the particular data item from the first cache on the first client. So, for a short period of time a principal that made the pending change on the first client may believe it was in fact permissible but once the global cache service determines that the pending change is not permissible the first agent is instructed to back out the change and notify the principal that the change was denied or unauthorized.

At 130, the global cache service records the pending change within the global cache when the pending change comports or agrees with the policy. Here, the policy as evaluated by the global cache service allows for the pending change to proceed. As a result, and as is discussed in greater detail below, the global cache service will cause other second client caches for other second clients to synchronize with the pending change that the first client initiated via the principal and as initially communicated by the first agent.

In a particular scenario, at 131, the global cache service maintains an identity for the principal that made the pending change on the first client for the particular data item and as noted in the global cache.

Continuing with the embodiment of 131 and at 132, the global cache service provides the identity of the principal to each of the one or more second agents for retention with the pending change and particular data item within each of the one or more second caches.

Still continuing with the embodiment of 132 and at 133, the global cache service receives from a particular second agent a denial of the pending change along with a second principal identify for a second principal on the second client associated with the second agent that is denying the pending change made by the first principal of the first client. Next, the global cache service evaluates a second policy using the second principal identity to ensure that the second principal is authorized to issue the denial of the first principal's pending change to the particular data item. If such second policy permits, the global cache service then removes the pending change from the global cache and instructs the first agent and remaining ones of the second agents (for other clients having the pending change) to back out the pending change and revert to the original version of the particular data item. In this manner, access control and security can be enforced based on policy with the global cache service acting as the gate keeper and enforcer to ensure principals are authorized to make changes to data items and other principals are authorized to deny the changes.

At 140, the global cache service dynamically and in real time pushes the pending change for the particular data item to the one or more second agents from the global cache. It may also be the case, at 140, that the one or more second agents dynamically pull the pending change for the particular data item from the global cache. Each second agent processes on a different second client of the network and each different second client has its own second cache where the data items for the backend resource are cached and independently being accessed, modified, created, and/or deleted.

According to an embodiment, at 141, the global cache service by pushing the pending change to the second client agents causes each of those second client agents to repaginate their caches and/or re-sort their caches. This is dependent upon the type of pending change occurring, such as adds and/or deletes where repagination and re-sorting is necessary to ensure each distributed cache can be properly searched and accessed on each distributed client. It is noted that the first client that made the pending change initially does any needed repagination and/or re-sort when the pending change is communicated, via the notice, to the global cache service. In some situations, at 141, the repagination and/or re-sort occur by a specific user view of their client cache, which is being repaginated and/or re-sort, is not altered during that viewing. In other words, if a specific user is viewing a list that is repaginated or re-sorted while that user is viewing, the client cache agent of the user ensures that while the user is viewing the list his position is stable so that the view does not change for the user.

In another situation, at 142, the global cache service records the pending change in a log. The entry recorded in the log can include a variety of useful information for reporting and auditing, such as but not limited to, a data item identifier, a backend resource identifier, a first principal identifier for the first principal originally making the pending change, a first client identifier, a first client agent identifier, a data and time stamp, any subsequent denial and if so details associated with such denial, and other items.

In an embodiment, at 150, the global cache service commits the pending change to the backend resource having the data item (if this is not a new data item being added to the backend resource). Once this commit or update successfully concludes or is acknowledged from the backend resource, the global cache service instructs the first agent and the second agents to remove the pending status from the particular data item in their caches to indicate that the pending change is now permanent and has updated to the backend resource.

FIG. 2 is a diagram of another method 200 for distributed cache management, according to an example embodiment. The method 200 (hereinafter "client cache service") is implemented in a machine-accessible and computer-readable storage medium as instructions that execute on one or more processors of a network node, such as a client. It is noted that multiple instances of the client cache service execute on different clients of the network. So, the client cache service is operational over a network. The network may be wired, wireless, or a combination of wired and wireless. Furthermore, the processor (client having a processing instance of the client cache service) is specifically configured to process the client cache service.

The global cache service represented by the method 100 of the FIG. 1 represents processing from the perspective of a server. The server offers access to a backend resource, such as a database, data warehouse, etc. The client cache service represents processing from the perspective of one client on the network that interacts with the server via the global cache service. It is noted once again that multiple clients exist on the network; each client has a processing instance of the client cache service and interacts with the global cache service in the manners discussed herein above and below.

In an embodiment, the client cache service may be viewed as the processing associated with the client agents discussed above with reference to the method 100 of the FIG. 1.

At 210, the client cache service receives a pending change for a data item from a global agent (such as the global cache service represented by the method 100 of the FIG. 1). The global agent manages and synchronizes a global cache for a server having one or more backend resources that utilize or need to be made aware of the data item. The change is pending in a sense that the change has not been updated or committed to the backend resources of the server.

At 220, the client cache service determines whether to accept or deny the pending change for the data item. When the pending change is accepted, the pending change is updated to a client cache on a client for the data items. So, the client cache now shows this data item having a pending change that is as of yet not updated to the backed resources of the server.

According to an embodiment, at 221, the client cache service denies the pending change for the data item based on or in response to a policy evaluation. Next, the client cache service instructs the global agent to back out the pending change from the global cache and further instruct second clients to back out the pending change for the data item in each of their one or more second client caches.

In another scenario, at 222, the client cache service denies the pending change for the data item in response to the policy and also in response to or in view of a principal identity associated with the pending change. That is, the pending change and data item also carry metadata when communicated from the global agent that identifies the principal that made originally proposed or made the pending change; this metadata is the principal identity. Next, the client cache service instructs the global agent to back out the pending change from the global cache and further instruct second clients to back out the pending change for the data item in each of their one or more second client caches.

In yet another situation, at 223, the client cache service interactively issues a request to a principal in communication with the client of the client cache service to provide a manual acceptance or denial of the pending change. It is noted that in cases where this particular principal is a user, the request may be an Instant Message, a dialogue box, even a text message asking for approval or denial. In other cases, where the principal is an automated service the request is issued via an Application Programming Interface (API) call to the service to communicate back in an automated fashion whether the pending change is acceptable or unacceptable. So, control over acceptance of the pending change can be delegated to a principal of the client; rather than via a dynamic policy evaluation. Although it may be that the policy itself when evaluated identifies the mechanism that the client cache service is to use to resolve the acceptance or denial of the pending change, such that the policy may state using another policy; use another policy in combination with the changing principal's identity; and/or request approval from a particular client principal.

At 230, the client cache service repaginates and/or re-sorts the client cache when such action is warranted by the pending change and when the pending change is accepted in the client cache by the client cache service. Again, depending upon the type of pending change a repagination may be necessary and/or a re-sort may be necessary of the client cache. In some situations, any current view of the cache that is being viewed by a user of the client cache remains stable for the user during the repagination and/or resort, this was discussed above with reference to the method 100 and with respect to the processing at 141.

According to an embodiment, at 240, the client cache service makes a second change to a different data item in the client cache. Next, the client cache service reports the second change to the global agent. The global agent then records this second change in the global cache and pushes the second change from the different data item to the one or more second clients for update to their one or more second caches. It is noted that it may also be that another instance of the client cache service dynamically forces a pull from the global cache to acquire the second change.

It may also be the case, at 250 that the client cache service makes a second change to the same data item that is flagged as having a pending change already. So, the data item identified with a pending change at 210. Thus, multiple changes can occur to a data item from the distributed clients before the global cache is flushed or updated to the backend resources of the server. Again, the client cache service reports the second change to the global agent. The global agent then records this second change in the global cache and pushes the second change from the same data item to the one or more second clients for update to their one or more second caches. Also, in some situations each of some of the one or more second clients can dynamically pull the change from the global cache to update their one or more second caches.

FIG. 3 is a diagram of a distributed cache management system 300, according to an example embodiment. The distributed cache management system 300 is implemented in a machine-accessible and computer-readable storage medium as instructions that execute on one or more processors (multiprocessor) and that is operational over a network. The one or more processors are specifically configured to process the components of the distributed cache management system 300. Moreover, the network may be wired, wireless, or a combination of wired and wireless. In an embodiment, the distributed cache management system 300 implements, among other things, certain aspects of the methods 100 and 200 represented by the FIGS. 1 and 2, respectively.

The distributed cache management system 300 includes a global cache agent 301 and a plurality of client cache agents 302-303. Each of these and their interactions with one another will now be discussed in turn The global cache agent 301 is implemented within and resides within a computer-readable storage medium and is to process on one or more processors of the network that comprise a server. Example aspects of the global cache agent 301 were presented in detail above with reference to the method 100 the FIG. 1.

The global cache agent 301 is configured to manage pending state changes for data items associated with a backend resource of the server via a global cache. Moreover, the global cache agent 301 is also configured to synchronize pending changes to the data items received from each of the client cache agents 302. This synchronization is achieved by receiving the pending changes from those client cache agents 302 originating the pending changes and then dynamically pushing the pending changes to those client cache agents 302 that did not originate the pending changes. It may also be the case that those client cache agents 302 that did not originate the pending changes can acquire the pending changes via a dynamic pull from the global cache agent 301 and the global cache.

According to an embodiment, the global cache agent 301 is also configured to enforce a policy to determine whether to allow the pending changes or whether to deny the pending changes.

In another case, the global cache agent 301 is configured to permit a particular client cache agent 302 to reject a particular change to a particular data item and in response thereto instruct the other remaining client cache agents 302 to back out that particular change in their client caches.

Each of the client cache agents 302 is implemented within and resides within a computer-readable storage medium. Moreover, each client cache agent 302 processes on a client of the network. Example aspects of the client cache agent were presented in detail above with reference to the method 200 of the FIG. 2.

The client cache agents 302 report pending changes to data items to the global cache agent 301 and receive notices from the global cache agent 301 when other different client cache agents 302 have made pending changes to data items.

In an embodiment, the client cache agents 302 are further configured to repaginate and/or re-sort their client caches when warranted by the types of changes occurring with the pending changes. Again, any users that are actively viewing their client caches can have stable views during any repagination and/or resort. So, a user's position within a list or other application that has its cache repaginated and/or re-sorted is not changed on the user.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a computer-readable storage medium that is executed by one or more processors of a network to perform the method, comprising:

configuring a global cache on a server to manage state changes for data items that are cached in multiple network clients, the global cache is a centralized cache for the network and each client includes its own independent cache and the global cache acting as a reverse proxy for a backend resource on the server, the backend resource is a directory service, wherein the data items are just data items that have been changed since being flushed and once flushed the data items are no longer present in the global cache unless subsequently changed in one of the independent caches;

receiving notice from a first agent, which processes on a first client, the notice indicating a pending change to a particular data item was made within a first cache of the first client;

recording the pending change within the global cache when the pending change comports with a first policy;

enforcing the first policy to identify a mechanism having a second policy for one or more second agents for the one or more second agents to use the mechanism to resolve whether to accept or deny the pending change, the second policy defining whether to instruct the one or more second agents to:

use the second policy for resolution;

use the second policy in combination with a changing principal's identity that made the pending change; and request approval from a particular client principal, and interactively receiving acceptance or denial of the pending change from the one or more second agents by sending a request to the one or more second agents and sending the request as a particular mechanism defined in the first policy, and the particular mechanism is an Application Programming Interface call when the particular client principal is an automated service, and the particular mechanism is one of: an instant message, a text message, and a dialogue box when the particular client principal is a particular user; and pushing the pending change with the second policy to the one or more second agents from the global cache, each second agent processing on a different second client and each different second client having a second cache where the data items are being independently accessed, and directing each second client to repaginate its cache and resort its cache but maintain an unchanged view when the particular user is viewing its cache before the repagination and resorting are processed, and receiving a second change for the particular data item before committing the pending change and before flushing the global cache with the pending change when the second change is received, and also reporting the second change to the clients.

2. The method of claim 1 further comprising, committing the pending change to a backend resource having the data items and instructing the first agent and the one or more second agents to remove a pending status from the particular data item to indicate that the pending change has been committed.

3. The method of claim 1, wherein receiving the notice further includes determining in response to the first policy that the pending change is unauthorized and instructing the first agent to back out the pending change from the first cache on the first client.

4. The method of claim 1, wherein recording further includes maintaining the changing principal's identity for a principal that made the pending change on the first client with the pending change for the particular data item in the global cache.

5. The method of claim 4, wherein pushing further includes providing the changing principal's identity to each of the one or more second agents for retention in each of the one or more second caches.

6. The method of claim 5, wherein providing further includes:
receiving from a particular second agent a denial of the pending change along with a second principal identity;
evaluating a third policy using the second principal identity indicating that a second principal is authorized to issue the denial;
removing the pending change from the global cache; and
instructing the first agent and remaining ones of the second agents to back out the pending change.

7. The method of claim 1, wherein pushing further includes recoding the pending change in a log along with a date and time stamp, a first client identifier for the first client and a principal identifier for a principal of the first client that initiated the pending change.

8. A method implemented and residing within a computer-readable storage medium that is executed by one or more processors of a network to perform the method, comprising:
receiving a pending change for a data item from a global agent that manages a global cache for a server, wherein the global cache includes just data items that have been changed since being flushed and once flushed the data items are no longer present in the global cache unless subsequent changes are made, the pending change received with a policy to resolve whether to accept or deny the pending change, and the policy defining whether to instruct processing to:
use the policy for resolution;
use the policy in combination with a changing principal's identity that made the pending change; and
request approval from a particular principal and wherein the global cache is a centralized cache on the server and acts as a reverse proxy for backend resources of the server, the global cache managing state changes for multiple data items existing on multiple independent caches for clients of the network, the backend resources are directory services, and receiving a request for the accepting or denying the pending change, the request including a particular mechanism defined in the policy, and the particular mechanism is an Application Programming Interface call when the particular principal is an automated service, and the particular mechanism is one of: a text message, an instant message, and a dialogue box when the particular principal is a user;
determining whether to accept or deny the pending change for the data item and when accepted updating a client cache on a client with the pending change, the determining achieved by evaluating the policy; and
repaginating and re-sorting the client cache based on the pending change when the pending change is accepted, wherein a current view of the client cache being viewed by the user of the client cache remains stable and unchanged for the user during the repagination and/or re sorting, and receiving a second change to the data item before committing the pending change and before flushing the global cache with the pending change when the second change is received, and also reporting the second change to the clients.

9. The method of claim 8 further comprising, making the second change to a different data item in the client cache and reporting the second change to the global agent, the global agent records the second change and pushes the second change to one or more second clients for updates to one or more second caches of the second clients or the global agent receives pull requests from the one or more second clients for each of the one or more second clients to pull the second change to their one or more second caches.

10. The method of claim 8, further comprising, making the second change to the data item in the client cache and reporting the second change to the global agent, the global agent records the second change and pushes the second change to one or more second clients for updates to one or more second caches of the second clients or the global agent receives pull requests from the one or more second clients for each of the one or more second clients to pull the second change to their one or more second caches.

11. The method of claim 8, wherein determining further includes denying the pending change for the data item in response to evaluation of the policy and then instructing the global agent to back out the pending change from the global cache and instructing one or more second clients to back out the pending change for the data item in one or more second caches.

12. The method of claim 8, wherein determining further includes denying the pending change for the data item in response to evaluation of the policy and in view of the changing principal's identity associated with the pending change, the changing principal's identity indicating a principal that made the pending change and then instructing the global agent to back out the pending change from the global cache and further instruct one or more second clients to back out the pending change for the data item in one or more second caches.

13. A multiprocessor-implemented system, comprising:
a global cache agent implemented in a computer-readable medium and to process on a server; and
a plurality of client cache agents implemented in computer-readable media, each client cache agent to process on a client and manage a client cache; the global cache agent is configured to manage pending state changes for data items associated with a backend resource of the server via a global cache, the backend resource is a directory service, wherein the global cache agent is further configured to synchronize pending changes to the data items received from each of the client cache agents by receiving the pending changes from those client cache agents originating the pending changes and pushing the pending changes to those client cache agents that did not originate the pending changes and pushing a first policy to identify a mechanism having a second policy for the client cache agents to use in resolving whether to accept or deny the pending changes, and interactively receiving acceptance or denial of the pending change from the client cache agents by sending a request to the client cache agents and sending the request as a particular mechanism defined in the first policy, and the particular mechanism is an Application Programming Interface call made to the one or more second agents, the second policy defining whether to instruct the client cache agents are to:

use the second policy for resolution;

use the second policy in combination with a changing principal's identity that made the pending change; and request approval from a particular client principal, wherein the global cache is a centralized cache for the network and each client includes its own independent cache and the global cache acting as a reverse proxy for a resource on the server, and client cache agent is to repaginate its cache and resort its cache but maintain an unchanged view when a particular user is viewing its cache before the repagination and resorting are processed, and the global cache agent configured to receiving a second change to a particular pending change for a particular data item before that particular pending change is committed and before flushing the global cache with the pending change when the second change is received, and also and reporting the second change to the client cache agents, and request the approval as one of: a text message, an instant message, and a dialogue box when the particular client principal is the particular user, wherein the global cache includes just data items that have been changed since being flushed and once flushed the data items are no longer present in the global cache unless subsequently changed in one of the independent caches.

14. The system of claim 13, wherein the global cache agent is configured to enforce a third policy to determine whether to allow the pending changes.

15. The system of claim 13, wherein the global cache agent is configured to permit a particular client cache agent to reject a particular change to a particular data item and in response thereto instructs the other client cache agents to back out the particular change in their client caches.

16. The system of claim 13, wherein the client cache agents are configured to repaginate and/or re-sort their client caches when warranted by the pending changes and any current views of users for the client caches on the clients remain stable so the users do not lose positions or locations in their current views.

* * * * *